(12) United States Patent
Demasi et al.

(10) Patent No.: US 12,047,502 B2
(45) Date of Patent: Jul. 23, 2024

(54) SYSTEMS AND METHODS FOR BACKING UP A HARDWARE KEY

(71) Applicant: Verizon Patent and Licensing Inc., Basking Ridge, NJ (US)

(72) Inventors: Rocco P. Demasi, Nanuet, NY (US); Jason M. Iannelli, Township of Washington, NJ (US); Ronald L. Bland, Woodstock, GA (US); Michael J. McGuinness, Hilliard, OH (US); Lori L Crimmins, Holly, MI (US); Michael L. Bowman, London, OH (US); Daniel J. Pfennig, Brockport, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 179 days.

(21) Appl. No.: 17/308,706

(22) Filed: May 5, 2021

(65) Prior Publication Data

US 2022/0360439 A1 Nov. 10, 2022

(51) Int. Cl.
*H04L 9/08* (2006.01)
*H04L 9/06* (2006.01)

(52) U.S. Cl.
CPC .......... *H04L 9/0897* (2013.01); *H04L 9/0631* (2013.01); *H04L 9/0643* (2013.01); *H04L 9/0825* (2013.01)

(58) Field of Classification Search
CPC ... H04L 9/0897; H04L 9/0631; H04L 9/0643; H04L 9/0825; H04L 9/0822; H04L 9/3239
See application file for complete search history.

(56) References Cited

U.S. PATENT DOCUMENTS

| 8,291,406 | B2 | 10/2012 | Milne et al. | |
|---|---|---|---|---|
| 8,688,853 | B2 | 4/2014 | Clune et al. | |
| 8,756,700 | B2 | 6/2014 | Demasi et al. | |
| 11,233,647 | B1* | 1/2022 | Fontaine | H04L 9/3215 |
| 2010/0031058 | A1* | 2/2010 | Kito | G06F 21/602 |
| | | | | 713/193 |
| 2010/0094740 | A1* | 4/2010 | Richter | G06Q 40/02 |
| | | | | 705/35 |
| 2010/0174919 | A1* | 7/2010 | Ito | G06F 21/74 |
| | | | | 713/192 |
| 2016/0099814 | A1* | 4/2016 | Negi | H04L 9/3268 |
| | | | | 713/171 |

(Continued)

*Primary Examiner* — Catherine Thiaw
*Assistant Examiner* — Hany S. Gadalla

(57) ABSTRACT

A user device may determine to back up a hardware key that is associated with a hardware component of the user device. The user device may determine that the user device has an operation key. The user device may retrieve the hardware key from a first data structure that is included in the user device and may encrypt, based on the operation key, the hardware key. The user device may process, after encrypting the hardware key, the hardware key to generate a hash value and may determine that the hash value is not included in a registry of the user device. The user device may transmit, based on determining that the hash value is not included in the registry, the encrypted hardware key to a server device to cause the hardware key to be backed up in a second data structure associated with the server device.

20 Claims, 11 Drawing Sheets

(56) References Cited

U.S. PATENT DOCUMENTS

| | | | |
|---|---|---|---|
| 2016/0294829 A1* | 10/2016 | Angus | H04L 63/18 |
| 2017/0083709 A1* | 3/2017 | Simmons | G06F 21/6218 |
| 2019/0005274 A1* | 1/2019 | Field | H04L 63/0428 |
| 2019/0036893 A1* | 1/2019 | Jiang | H04L 63/164 |
| 2020/0013241 A1* | 1/2020 | Johnson | B60R 25/248 |
| 2020/0382295 A1* | 12/2020 | Howells | H04L 9/3066 |
| 2021/0011815 A1* | 1/2021 | Chandrashekar | G06F 11/1469 |
| 2022/0094547 A1* | 3/2022 | Duchastel | H04L 63/0807 |

\* cited by examiner

SYSTEMS AND METHODS FOR BACKING UP A HARDWARE KEY

BACKGROUND

A hardware key may be used to secure access to a hardware component, such a hard drive, of a user device. A portion of the hardware component may be encrypted and the hardware key may be used to unlock or decrypt the hardware component.

DETAILED DESCRIPTION OF PREFERRED EMBODIMENTS

Figure 1A:
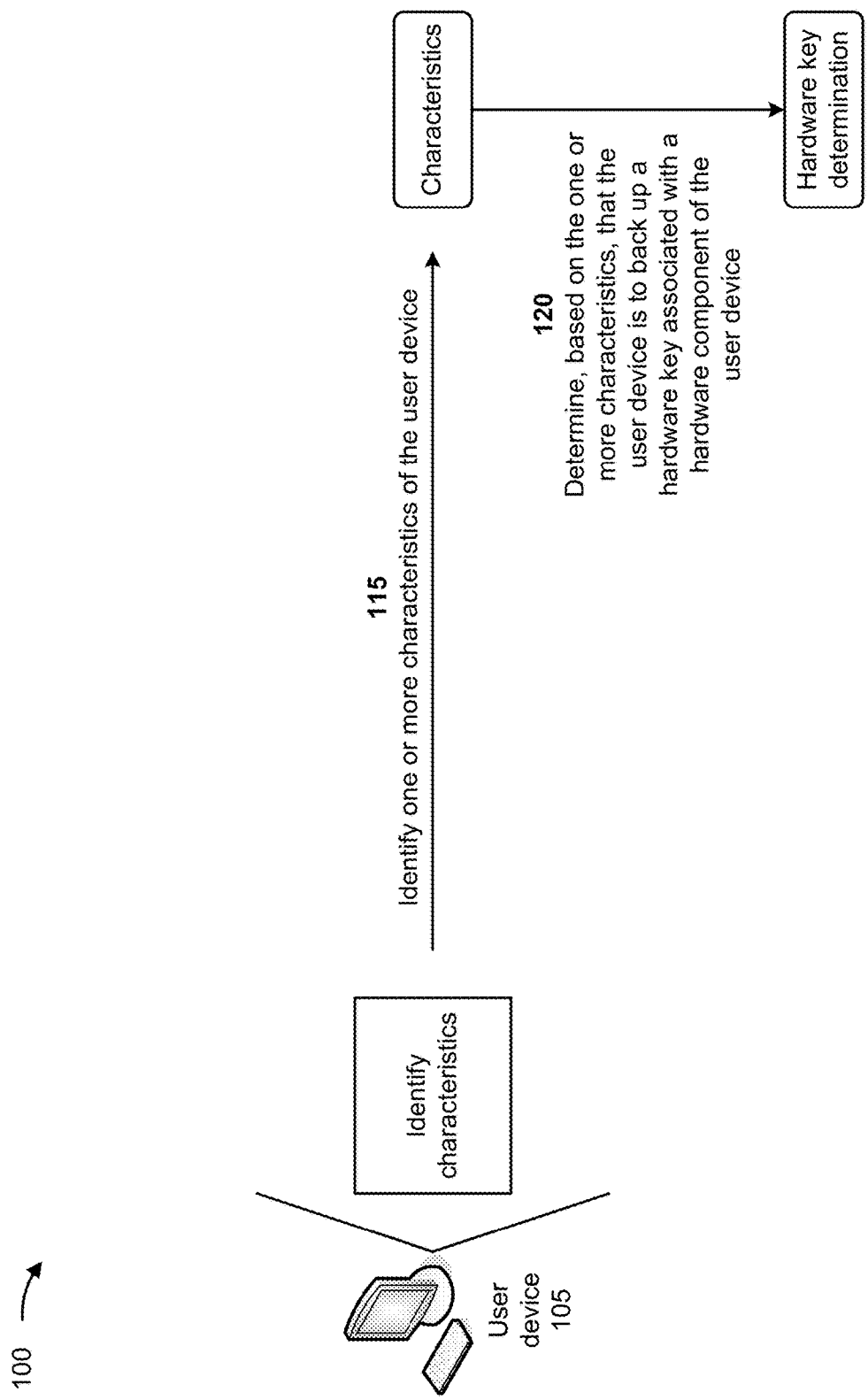
FIGS. 1A-1G are diagrams of an example associated with backing up a hardware key.

The following detailed description of example implementations refers to the accompanying drawings. The same reference numbers in different drawings may identify the same or similar elements.

A user device may utilize a hardware key to secure access to a hardware component (e.g., a hard drive, a solid-state drive, a portable disk, and/or other hardware components). For example, a portion of the hardware component may be encrypted and the user device may need to use the hardware key to unlock and access the encrypted portion of the hardware component and/or to obtain data from the encrypted portion. Typically, a hardware key can be locally saved (e.g., to a thumb drive) by the user device to ensure that the user device can later retrieve and use the hardware key to access the hardware component (e.g., after the user device has experienced a crash, a rebuild the user device, and/or an upgrade of an operating system (OS) of the user device, among other examples). However, a local storage option isn't practical for an entity that deploys and maintains a multitude of user devices (e.g., tens, hundreds, or thousands of user devices).

Some implementations described herein provide a user device associated with a server device. The user device may determine, based on one or more characteristics of the user device, that the user device is to back up a hardware key that is associated with a hardware component of the user device. Accordingly, the user device may retrieve the hardware key from a data structure that is included in the user device and may encrypt the hardware key (e.g., using an encryption algorithm that utilizes an operation key as an encryption key). The user device may process the hardware key to generate a hash value and may determine whether the hash value is included in a registry of the user device (e.g., that includes registry key values that are hashes of backed up hardware keys). The user device may transmit, based on determining that the hash value is not included in the registry (which indicates that the hardware key has not been previously backed up), the hardware key to the server device to cause the hardware key to be backed up in a data structure associated with the server device.

The server device may receive the hardware key and may decrypt the hardware key. For example, the server device may retrieve the operation key (e.g., that was used to encrypt the hardware key by the user device) from a data structure that is associated with the server device and may decrypt the hardware key (e.g., using the same encryption algorithm used by the user device and utilizing the operation key as a decryption key). Further, the server device may encrypt the hardware key (e.g., using an encryption algorithm that utilizes an encryption key that is different than the operation key) and may cause the hardware key to be stored in another data structure associated with the server device.

In this way, the user device and/or the server device automatically cause a hardware key of the user device to be backed up in a data structure associated with the server device. Further, the use of multiple encryption steps and, in some implementations, a secure connection (e.g., a transport layer security (TLS) connection) between the user device and the server device (e.g., to allow the user device to transmit the hardware key to the server device) ensures that the hardware key is securely handled when the hardware key is backed up. This reduces a likelihood of imperiling the hardware key and/or impacting a security of the user device and/or the hardware component of the user device.

Additionally, some implementations described herein enable an entity to automatically obtain backups of respective hardware keys of a multitude of user devices (e.g., that are maintained by the entity). This reduces a utilization of computing resources (e.g., processing resources, memory resources, communication resources, and/or power resources, among other examples) of the user devices and/or other devices that would otherwise be needed to locally back up the respective hardware keys (and then send the backed up hardware keys to a central repository associated with the entity). Accordingly, when a user device encounters an event (e.g., a crash event, a rebuild event, and/or an OS upgrade event, among other examples) that requires input of information associated with a hardware key, the user device may obtain the backed up copy of the hardware key from the server device, and the user device therefore may be able to unlock and access the hardware component and/or obtain data from the hardware component. Thus, some implementations described herein prevent a loss of data (e.g., that is associated with the hardware component) and/or a loss of functionality of the hardware component in relation to the user device.

FIGS. 1A-1G are diagrams of one or more examples 100 associated with backing up a hardware key. As shown in FIGS. 1A-1G, example(s) 100 may include a user device 105 associated with a server device 110. The user device 105 and the server device 110 may be associated with an entity (e.g., a company, an organization, an institute, and/or a university) and may be connected to each other via a network (e.g., the Internet). Further details of the user device 105 and server device 110 are provided below.

The user device 105 may include a hardware component (e.g., a hard drive, a solid-state drive, a portable disk, and/or other hardware components). Access to the hardware component by the user device 105 may be secured using a hardware key, such as a Microsoft BitLocker key. In some implementations, the hardware key may change (or a new hardware component with a new hardware key may be added to the user device 105). In some implementations, such as when the user device 105 is one of many user devices managed by the entity, the user device 105 may need to back up the changed hardware key (or the new hardware key) to the server device 110. This may allow a system administrator of the entity to remotely facilitate service of the user device 105 when the user device 105 encounters an issue (e.g., when the user device 105 crashes, a user of the user device 105 changes, and/or data from the hardware component needs to be recovered, among other examples).

In some implementations, the user device 105 may include a monitoring module (or another similar module or component). The user device, when using the monitoring module, may monitor hardware keys associated with the user device. For example, the user device may monitor (e.g., on a scheduled basis, on an on-demand basis, and/or on a triggered basis, among other examples) whether a hardware key has changed, or a new hardware key has been introduced to the user device 105, and automatically cause the hardware key to be backed up, as described in further detail herein.

As shown in FIG. 1A, and by reference number 115, the user device 105 may identify one or more characteristics of the user device 105. The one or more characteristics may include a type of the user device 105 (e.g., whether the user device 105 is a laptop computer, a desktop computer, or other computing device), a capability of the user device 105 (e.g., whether the user device 105 is able to utilize a hardware key and/or whether the user device 105 is able to communicate via the network), a role of the user device 105 within a network (e.g., whether the user device 105 is a general user device 105 or a personalized user device 105), and/or an organizational identifier associated with the user device (e.g., that indicates a group or subgroup of the entity to which the user device 105 belongs), among other examples.

As further shown in FIG. 1A, and by reference number 120, the user device 105 may determine (e.g., based on the one or more characteristics) that the user device 105 is to back up a hardware key that is associated with a hardware component of the user device 105. For example, the user device 105 may determine, based on the one or more characteristics (e.g., that include a type of the user device 105 and/or a capability of the user device 105), that the user device 105 utilizes the hardware key (e.g., to secure access to the hardware component) and/or that the user device 105 is able to back up the hardware key (e.g., the user device 105 is connected to the server device 110 via the network). The user device 105 therefore may determine that the user device 105 is to back up the hardware key. As another example, the user device 105 may determine, based on the one or more characteristics (e.g., that include a role of the user device 105 and/or an organizational identifier associated with the user device 105) that the user device 105 is a personalized user device 105 and/or belongs to a particular group of the entity. The user device 105 therefore may determine that the user device 105 is to back up the hardware key.

Figure 1B:
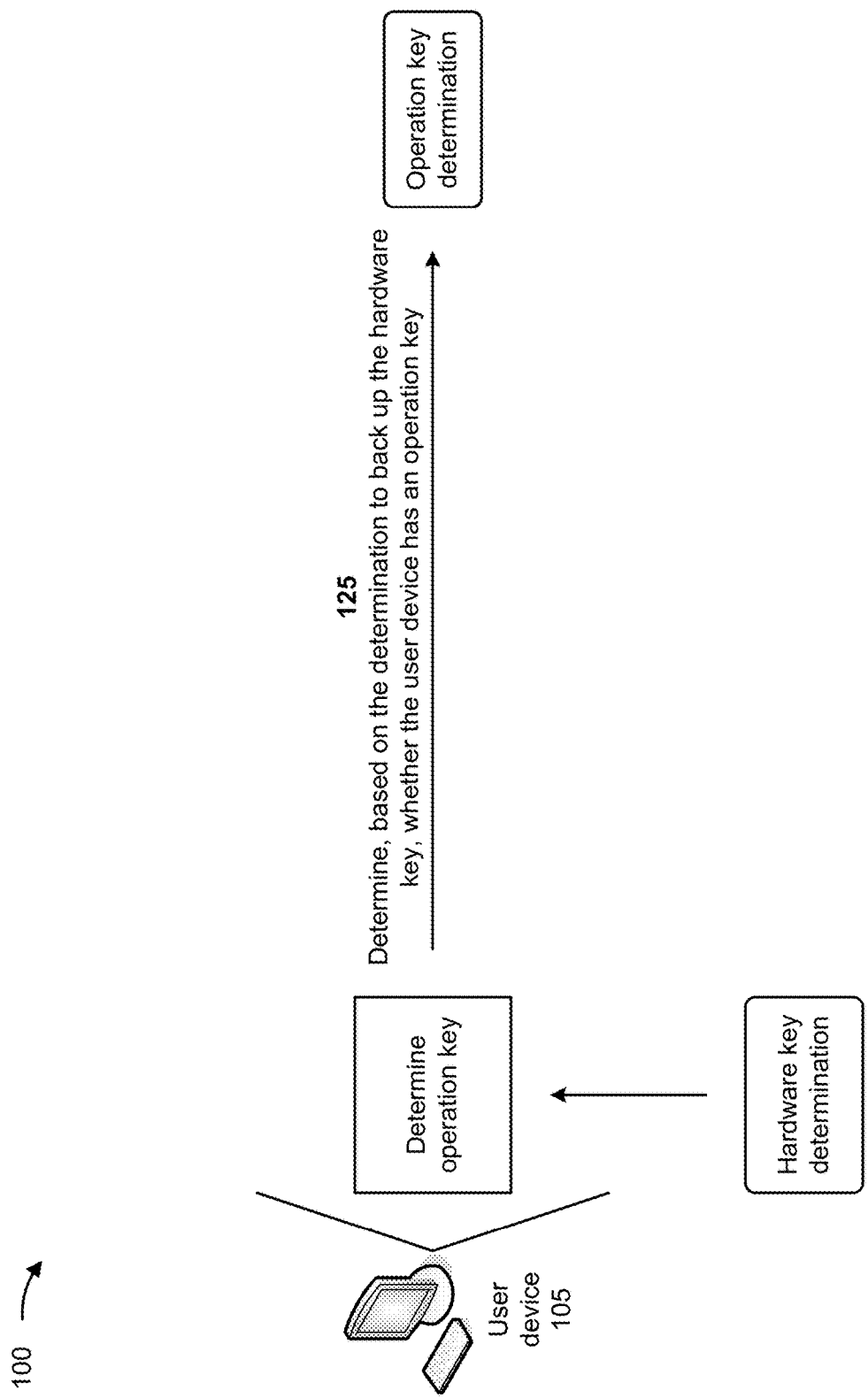

As shown in FIG. 1B, and by reference number 125, the user device 105 may determine (e.g., based on the determination to back up the hardware key) whether the user device 105 has an operation key. The operation key may be a key that is associated with the entity and that is unique to the user device 105. The operation key may be used for communicating entity-specific information between the user device 105 and the server device 110. For example, the operation key may be used to encrypt the hardware key and/or to cause a secure connection to be established between the user device 105 and the server device 110 (e.g., as described elsewhere herein).

In some implementations, the user device 105 may identify a data structure (e.g., that is included in the user device 105 and/or is accessible to the user device 105) that is associated with the entity (e.g., a database, an electronic file structure, an electronic file, and/or another data structure that includes entity-specific configuration information). The user device 105 may search the data structure for the operation key and may determine that the user device 105 has the operation key, based on successfully searching the data structure. Alternatively, the data structure may determine that the user device 105 does not have an operation key (e.g., the user device 105 was not allocated an operation key from another device, such as the server device 110), based on unsuccessfully searching the data structure. Accordingly, the user device 105 may cease performing any additional processing steps to back up the hardware key.

Figure 1C:
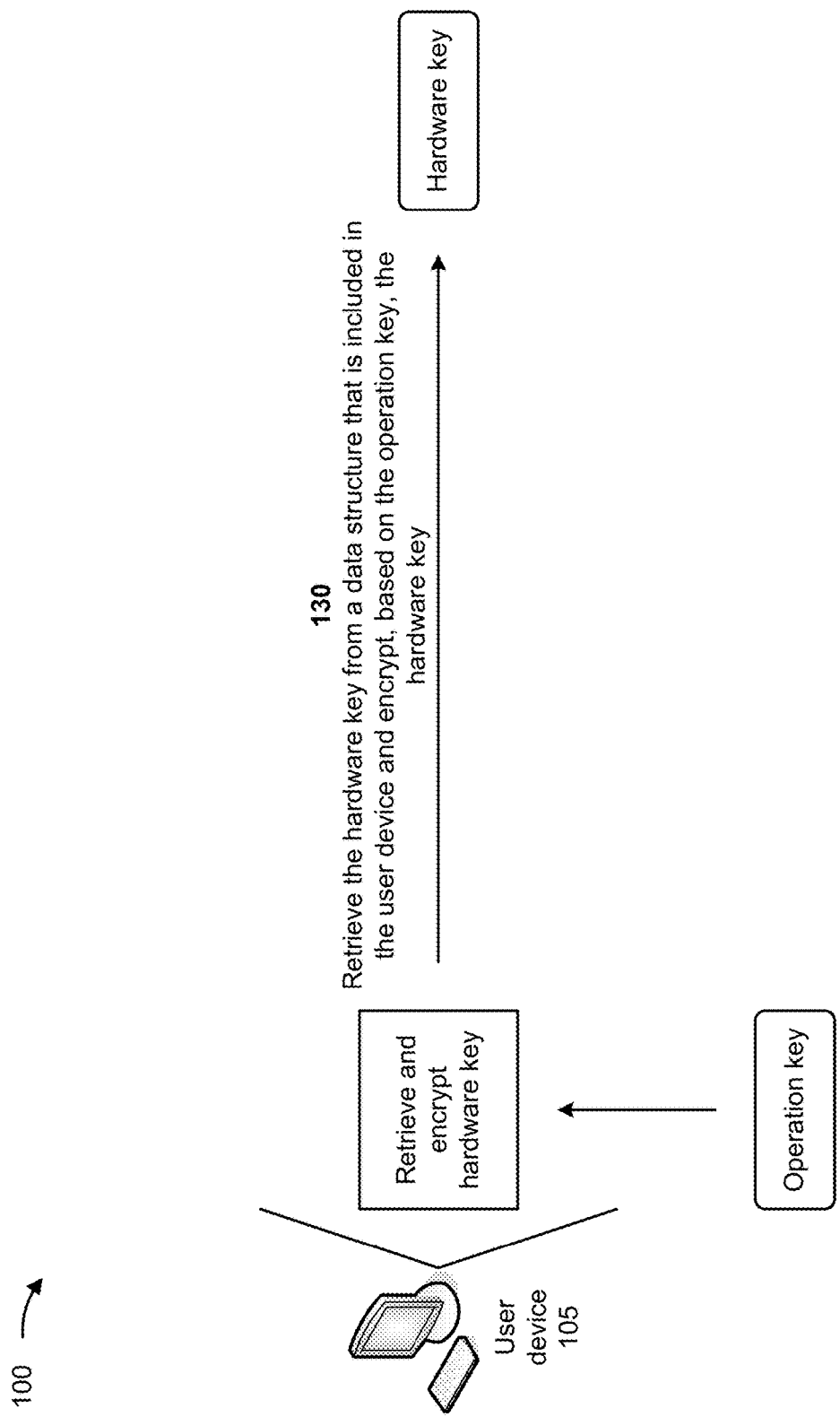

As shown in FIG. 1C, and by reference number 130, the user device 105 may retrieve the hardware key from a data structure and may encrypt the hardware key (e.g., based on determining that the user device 105 has the operation key). For example, the user device 105 may include (or may be associated with) a trusted platform module (TPM) component, such as a cryptoprocessor, that is associated with a data structure (e.g., a database, an electronic file structure, an electronic file, and/or another data structure that stores hardware keys associated with hardware components of the user device 105). The user device 105 may communicate with the TPM component (e.g., using a management module of the user device 105, such as a Windows management instrumentation (WMI) module) to obtain access to the data structure. The user device 105 may retrieve the hardware key from the data structure after obtaining access to the data structure. Further, the user device 105 may process the hardware key using an encryption algorithm, such as an advanced encryption standard (AES) algorithm (e.g., AES 128, AES 192, or AES 256). In some implementations, the user device 105 may use the operation key as an encryption key for the encryption algorithm to encrypt the hardware key.

Figure 1D:
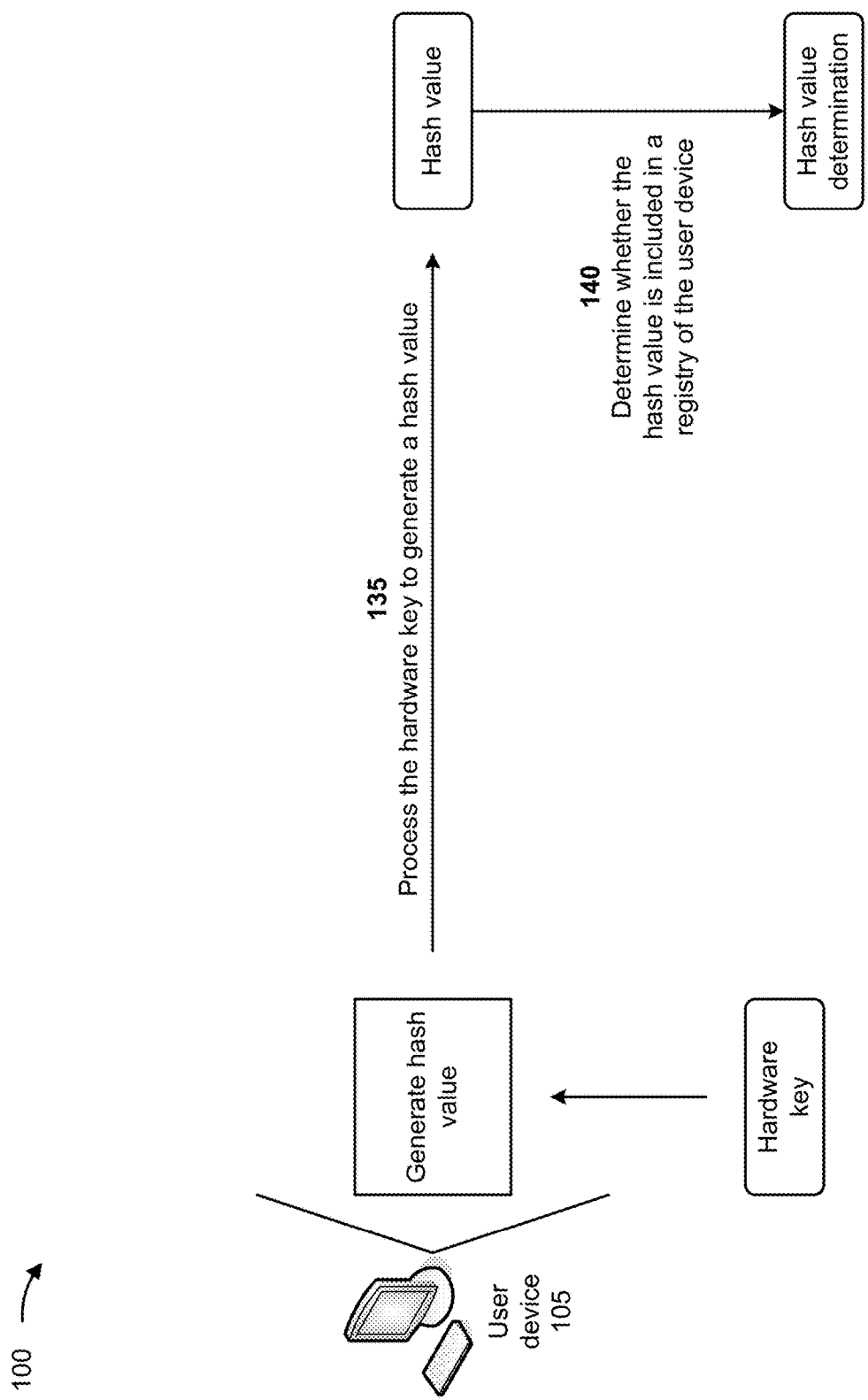

As shown in FIG. 1D, and by reference number 135, the user device 105 may process the hardware key to generate a hash value (e.g., after the user device 105 has encrypted the hardware key). For example, the user device 105 may process the hardware key using a hash algorithm, such as a secure hashing algorithm (SHA) (e.g., SHA-256, SHA-384, or SHA-512), to generate the hash value.

As further shown in FIG. 1D, and by reference number 140, the user device 105 may determine whether the hash value is included in a registry of the user device 105. For example, the user device 105 may identify a set of registry key values (e.g., that are hash values of other hardware keys of the user device 105 that are backed up by the server device 110) that are included in the registry, and may determine whether the hash value matches (e.g., has a same value as) any registry key value of the set of registry key values. The user device 105 may determine that the hash value matches a particular registry key value (e.g., determine that the hash value matches a hash value of a backed up hardware key) and therefore may determine that the hash value is included in the registry. Accordingly, the user device 105 may cease performing any additional processing steps to back up the hardware key. Alternatively, the user device 105 may determine that the hash value does not match any registry key value (e.g., determine that the hash value does not match a hash value of a backed up hardware key) of the set of registry key values and therefore may determine that the hash value is not included in the registry. Accordingly, the user device 105 may perform one or more processing steps described in relation to FIG. 1E to back up the hardware key.

Figure 1E:
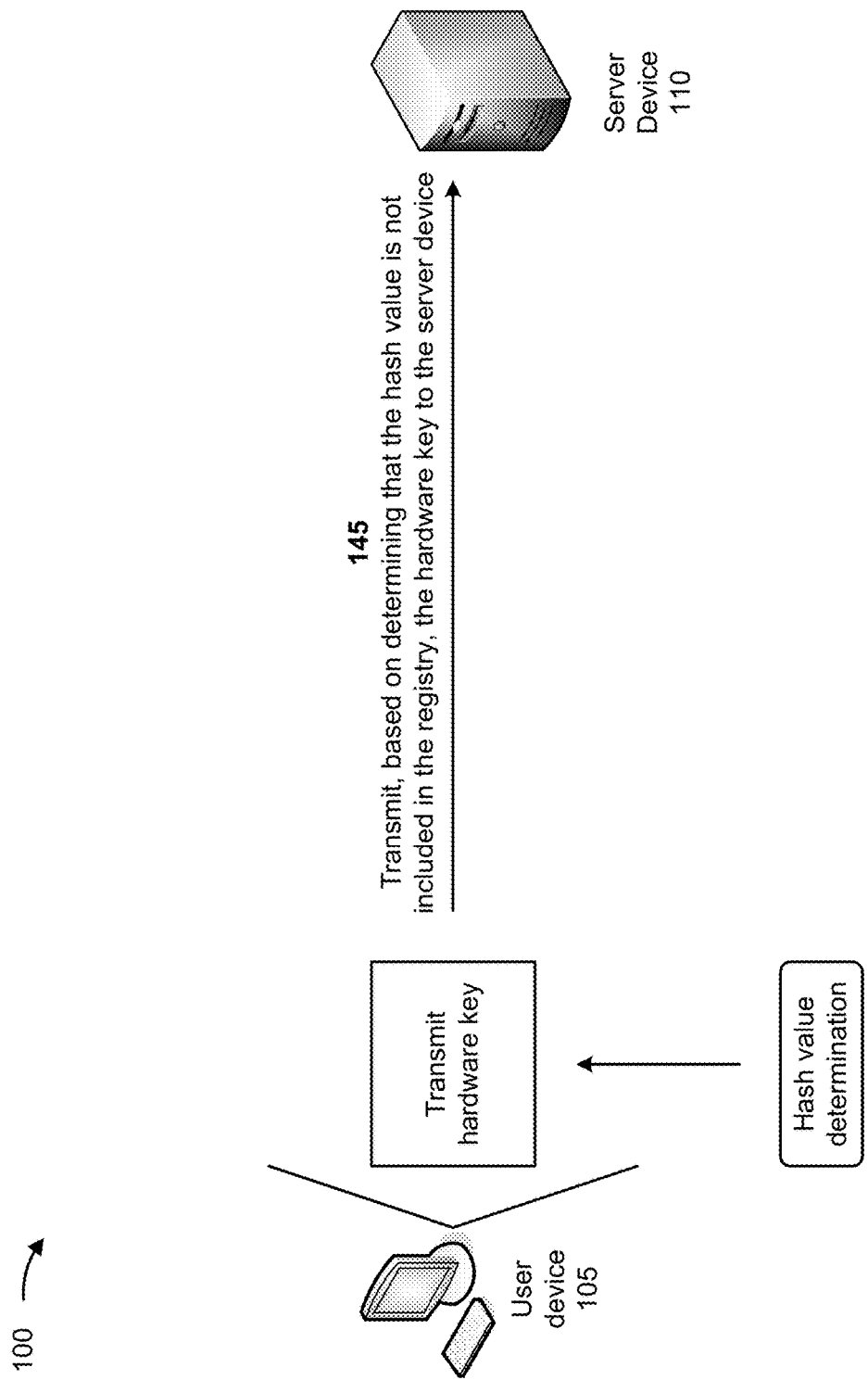

As shown in FIG. 1E, and by reference number 145, the user device 105 may transmit (e.g., based on determining that the hash value is not included in the registry), the hardware key (e.g., that has been encrypted) to the server device 110 (e.g., to cause the hardware key to be backed up in a data structure associated with the server device 110). For example, the user device 105 may cause a secure connection, such as a transport layer security (TLS) connection, to be established between the user device 105 and the server device 110. In some implementations, the user device 105 may use the operation key as a session key to cause the secure connection to be established between the user device 105 and the server device 110. Accordingly, the user device 105 may send the hardware key to the server device 110 via the secure connection (e.g., to cause the server device 110 to back up the hardware key in a data structure associated with the server device 110).

In some implementations, the user device 105 may update the registry of the user device 105 (e.g., after transmitting the hardware key to the server device 110). For example, the user device 105 may update the registry to include the hash value as a registry key value associated with the hardware component. In this way, the user device 105 may update the registry to indicate that the hardware key has been backed up (e.g., in a data structure associated with the server device 110).

Figure 1F:
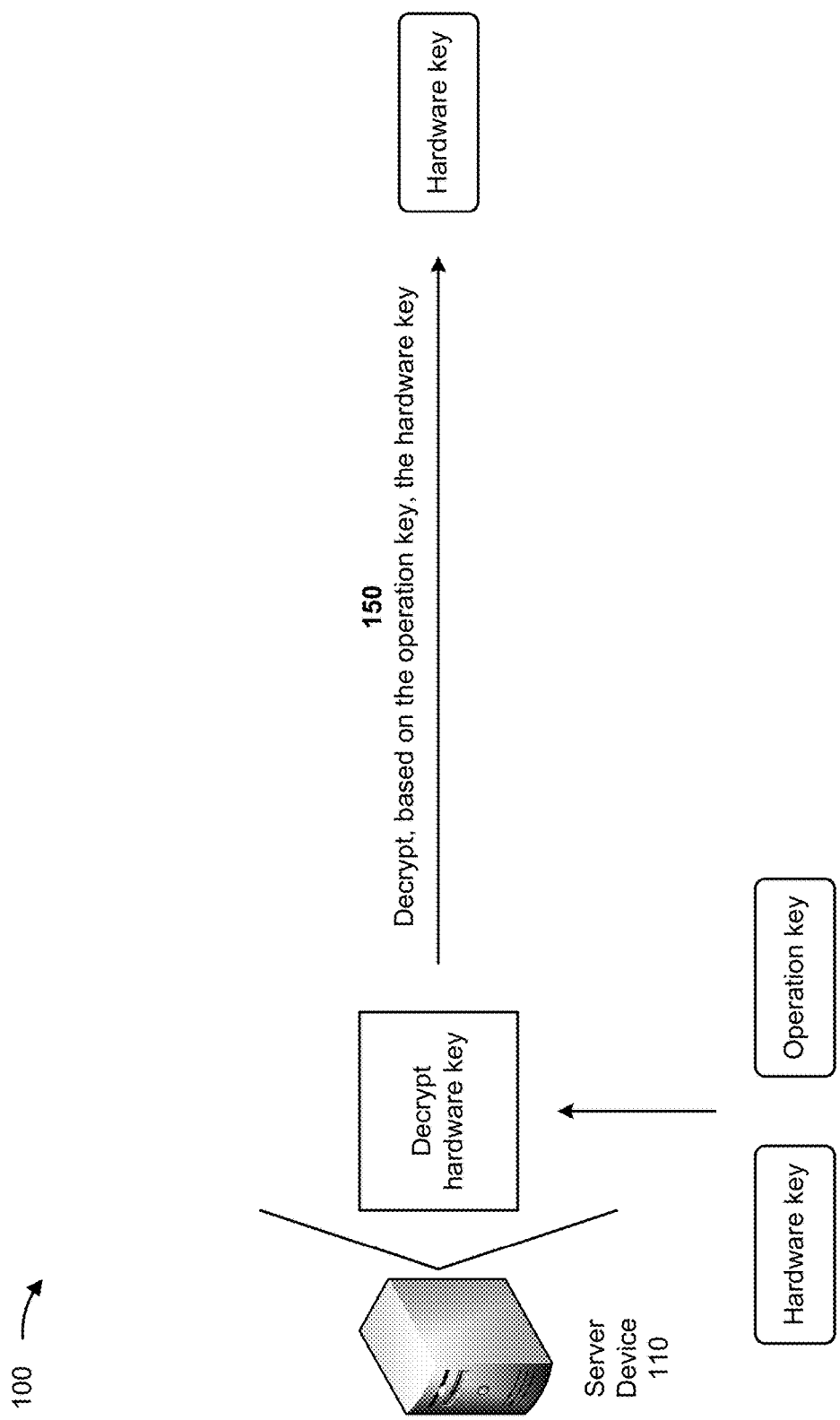

As shown in FIG. 1F, and by reference number 150, the server device 110 may decrypt the hardware key (e.g., after receiving the hardware key from the user device 105). For example, the server device 110 may decrypt the hardware key using the encryption algorithm that the user device 105 used to encrypt the hardware key (e.g., an AES algorithm). In some implementations, the server device 110 may retrieve the operation key (e.g., that the user device 105 used as an encryption key to encrypt the hardware key) from a data structure (e.g., a database, an electronic file structure, an electronic file, and/or another data structure that is included in the server device 110 and/or accessible to the server device 110) and decrypt the hardware key based on the operation key. For example, the server device 110 may determine (e.g., based on receiving the hardware key and/or establishment of the secure connection between the user device 105 and the server device 110) an identifier associated with the user device 105 (e.g., an Internet protocol (IP) address of the user device 105, a media access control address (MAC) of the user device 105, and/or a unique identifier (UID) of the user device 105, among other examples). The server device 110 may search, based on the identifier, the data structure to identify an entry associated with the user device 105. When the server device 110 successfully finds the entry, the server device 110 may process (e.g., parse) the entry to retrieve the operation key. Accordingly, the server device 110 may decrypt the hardware key based on the operation key. When the server device 110 does not successfully find the entry, the server device 110 may transmit a message to the user device 105 (e.g., via the secure connection) indicating that the server device 110 is unable to decrypt the hardware key.

Figure 1G:
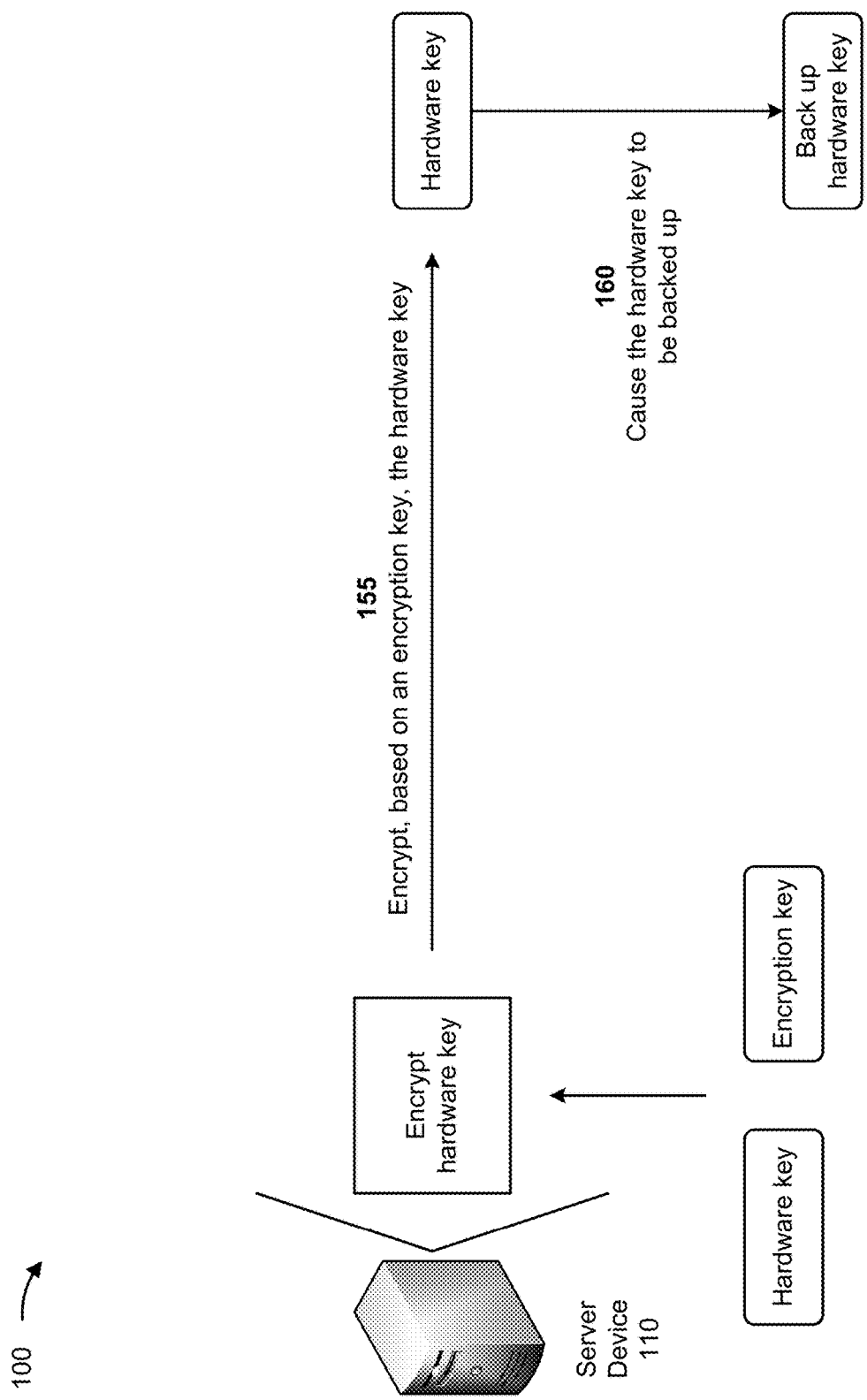

As shown in FIG. 1G, and by reference number 155, the server device 110 may encrypt the hardware key (e.g., after decrypting the hardware key). For example, the user device 105 may process the hardware key using an encryption algorithm (e.g., that is different than the encryption algorithm used by the user device 105 to encrypt the hardware key prior to transmitting the hardware key to the server device 110), such as an AES algorithm (e.g., AES 128, AES 192, or AES 256). In some implementations, the user device 105 may use an encryption key (e.g., that is different than the operation key) for the encryption algorithm. For example, the server device 110 may identify an encryption key that is associated with a data structure (e.g., a structured query language (SQL) data structure, or another data structure, that is included in the server device 110 and/or is accessible to the server device 110) and may encrypt the hardware key based on the encryption key. The data structure may be configured to store hardware keys associated with the user device 105 and/or other hardware keys associated with other user devices. The encryption key may be configured to encrypt hardware keys for storage in the data structure (e.g., the encryption key may be an SQL encryption key).

As further shown in FIG. 1G, and by reference number 160, the server device 110 may cause the hardware key to be backed up (e.g., after encrypting the hardware key). For example, the server device 110 may store the hardware key in the data structure (e.g., that is configured to store hardware keys). The server device 110 may store the hardware key as an entry in the data structure, such that the entry includes the identifier associated with the user device 105 and the hardware key. In some implementations, after causing the hardware key to be backed up (e.g., after successfully storing the hardware key in the data structure), the server device 110 may send, to the user device 105 (e.g., via the secure connection), a message indicating that the hardware key was successfully backed up. Alternatively, after failing to cause the hardware key to be backed up (e.g., after unsuccessfully storing the hardware key in the data structure), the server device 110 may send, to the user device 105 (e.g., via the secure connection), a message indicating that the hardware key was not successfully backed up.

As indicated above, FIGS. 1A-1G are provided as an example. In practice, there may be additional devices and/or networks, fewer devices and/or networks, different devices and/or networks, or differently arranged devices and/or networks than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) of one or more examples 100 may perform one or more functions described as being performed by another set of devices of one or more examples 100.

Figure 2:
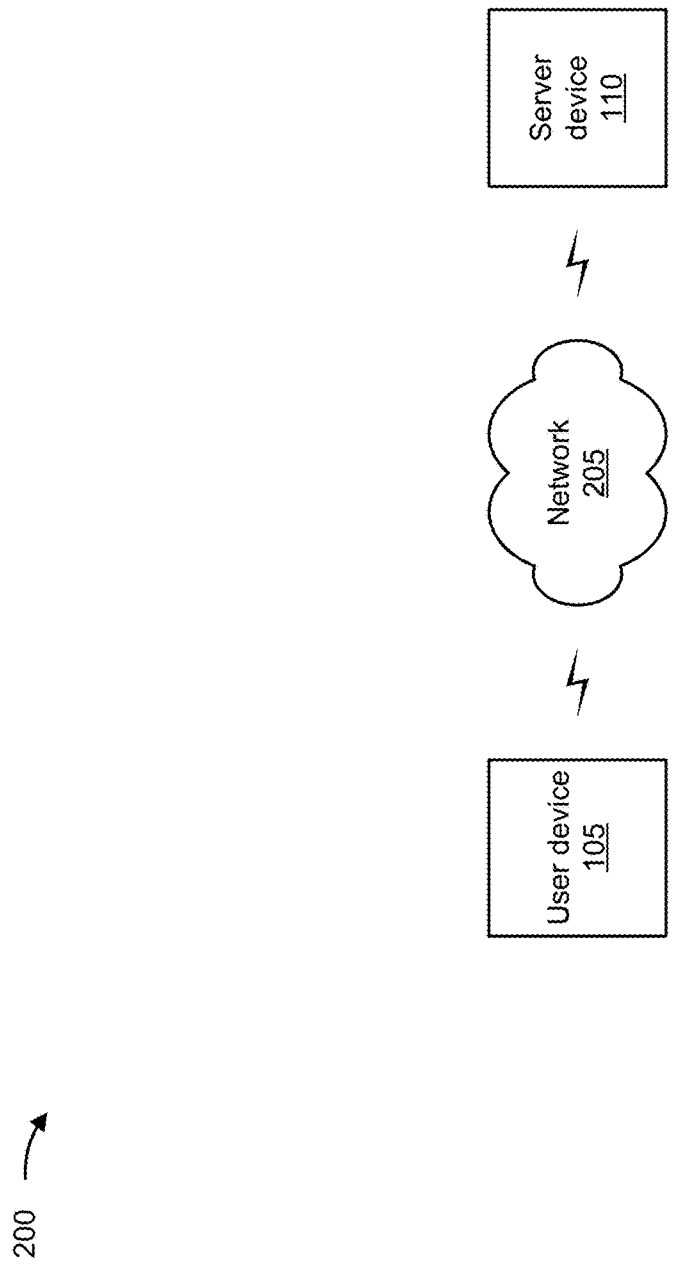
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the user device 105, the server device 110, and a network 205.

The user device 105 includes one or more devices capable of receiving, generating, storing, processing, and/or providing information associated with backing up a hardware key, as described elsewhere herein. The user device 105 may include a communication device and/or a computing device. For example, the user device 105 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), or a similar type of device. In some implementations, the user device 105 may include a computing device (e.g., that runs a version of Microsoft Windows operating system) that utilizes a hardware key, such as such as a Microsoft BitLocker key. In some implementations, the user device 105 may include a hardware component (e.g., a hard drive, a solid-state drive, a portable disk, and/or other hardware components). In some implementations, the user device 105 may include a trusted platform module (TPM) component (e.g., a cryptoprocessor or other TPM component). The user device 105 may communicate with one or more other devices of environment 200, as described elsewhere herein.

The server device 110 includes one or more devices capable of receiving, generating, storing, processing, providing, and/or routing information associated with backing up a hardware key, as described elsewhere herein. The server device 110 may include a communication device and/or a computing device. For example, the server device 110 may include a server, such as an application server, a client server, a web server, a database server, a host server, a proxy server, a virtual server (e.g., executing on computing hardware), or a server in a cloud computing system. In some implementations, the server device 110 includes computing hardware used in a cloud computing environment. The server device 110 may communicate with one or more other devices of environment 200, as described elsewhere herein.

The network 205 includes one or more wired and/or wireless networks. For example, the network 205 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 205 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
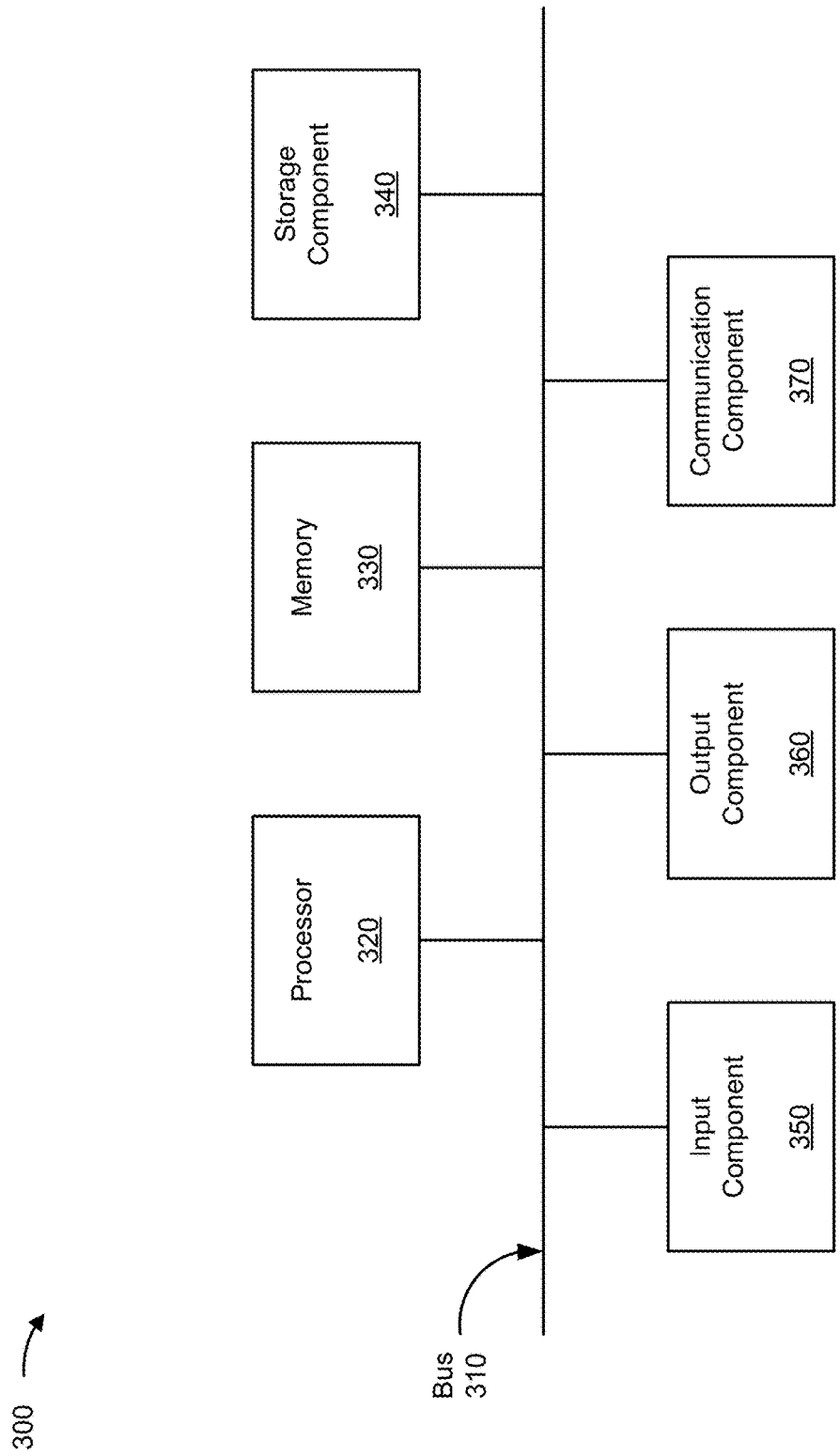
FIG. 3 is a diagram of example components of one or more devices of FIG. 2.

FIG. 3 is a diagram of example components of a device 300, which may correspond to the user device 105 and/or the server device 110. In some implementations, the user device 105 and/or the server device 110 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
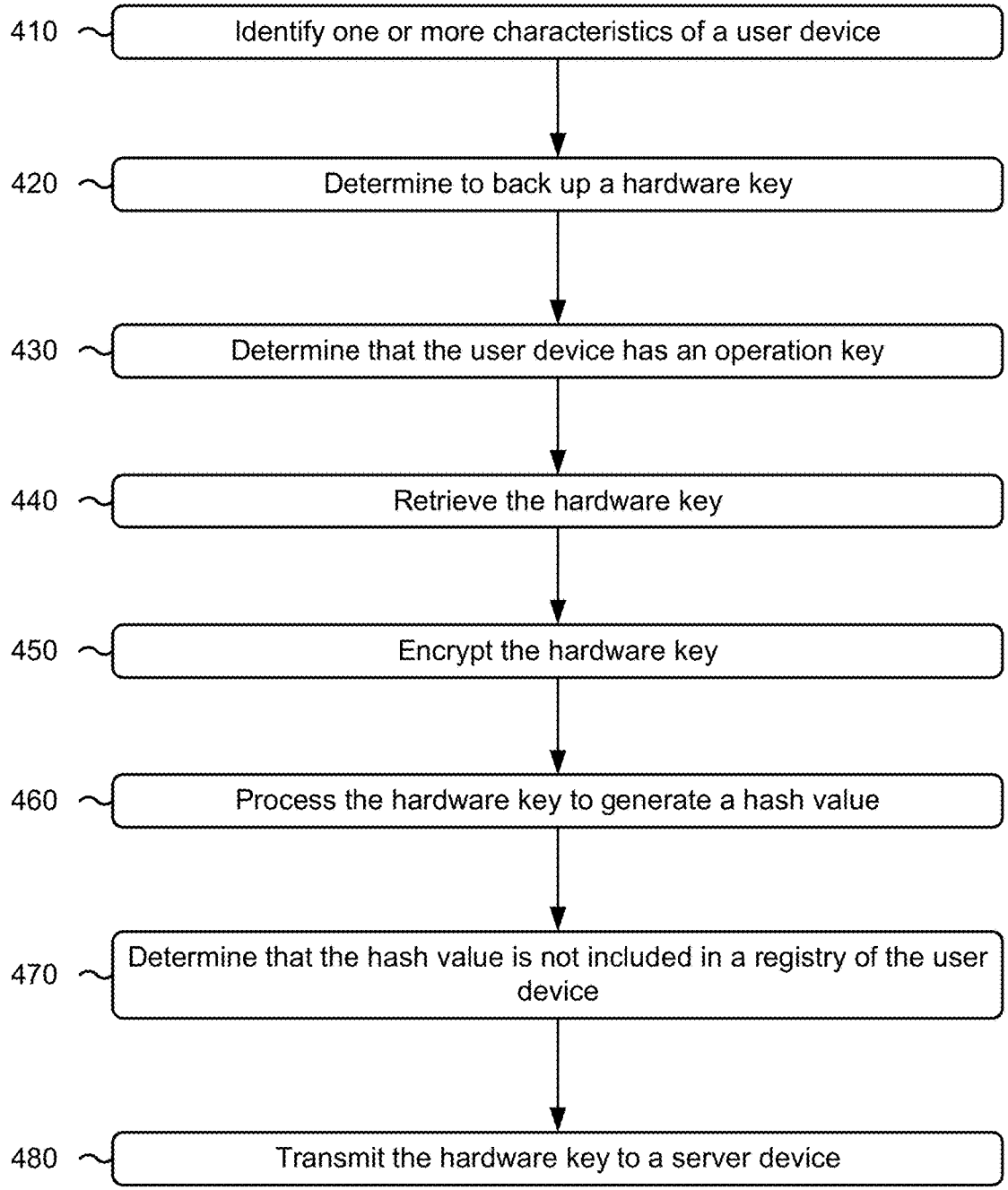
FIGS. 4-5 are flowcharts of example processes relating to backing up a hardware key.

FIG. 4 is a flowchart of an example process 400 associated with backing up a hardware key. In some implementations, one or more process blocks of FIG. 4 may be performed by a user device (e.g., user device 105). In some implementations, one or more process blocks of FIG. 4 may be performed by another device or a group of devices separate from or including the user device, such as a server device (e.g., server device 110). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include identifying one or more characteristics of the user device (block 410). For example, the user device may identify one or more characteristics of the user device, as described above. In some implementations, the one or more characteristics comprise at least one of a type of the user device, a capability of the user device, a role of the user device within a network, or an organizational identifier associated with the user device.

As further shown in FIG. 4, process 400 may include determining to back up a hardware key (block 420). For example, the user device may determine, based on the one or more characteristics, that the user device is to back up a hardware key that is associated with a hardware component of the user device, as described above. In some implementations, determining that the user device is to back up the hardware key comprises determining, based on the one or more characteristics, that the user device utilizes the hardware key, determining, based on the one or more characteristics, that the user device is able to back up the hardware key, and determining, based on determining that the user device utilizes the hardware key and that the user device is able to back up the hardware key, that the user device is to back up the hardware key.

As further shown in FIG. 4, process 400 may include determining that the user device has an operation key (block 430). For example, the user device may determine that the user device has an operation key, as described above. In some implementations, the operation key, the user device, and the server device are associated with an entity, and determining that the user device has the operation key comprises identifying a third data structure included in the user device that is associated with the entity, searching the third data structure for the operation key, and determining that the user device has the operation key based on successfully searching the third data structure for the operation key.

As further shown in FIG. 4, process 400 may include retrieving the hardware key (block 440). For example, the user device may retrieve the hardware key from a first data structure that is included in the user device, as described above. In some implementations, the first data structure is associated with a trusted platform module (TPM) component of the user device, and retrieving the hardware key from the first data structure comprises communicating with the TPM component to obtain access to the first data structure, and retrieving the hardware key from the first data structure after obtaining access to the first data structure. In some implementations, retrieving the hardware key from the first data structure comprises communicating with a cryptoprocessor of the user device to obtain access to the first data structure, and retrieving the hardware key from the first data structure after obtaining access to the first data structure.

As further shown in FIG. 4, process 400 may include encrypting the hardware key (block 450). For example, the user device may encrypt, based on the operation key, the hardware key, as described above. In some implementations, encrypting the hardware key comprises processing, using an advanced encryption standard (AES) algorithm with the operation key as an encrypting key, the hardware key.

As further shown in FIG. 4, process 400 may include processing the hardware key to generate a hash value (block 460). For example, the user device may process, after encrypting the hardware key, the hardware key to generate a hash value, as described above. In some implementations, processing the hardware key to generate the hash value comprises processing, using a secure hash algorithm (SHA), the hardware key to generate the hash value.

As further shown in FIG. 4, process 400 may include determining that the hash value is not included in a registry of the user device (block 470). For example, the user device may determine that the hash value is not included in a registry of the user device, as described above. In some implementations, determining that the hash value is not included in the registry of the user device comprises identifying a set of registry key values in the registry, determining that the hash value does not match any registry key value of the set of registry key values, and determining that the hash value is not included in the registry based on determining that the hash value does not match any registry key value of the set of registry key values.

As further shown in FIG. 4, process 400 may include transmitting the hardware key to a server device (block 480). For example, the user device may transmit, based on determining that the hash value is not included in the registry, the hardware key (e.g., after the hardware key has been encrypted) to a server device to cause the hardware key to be backed up in a second data structure associated with the server device, as described above. In some implementations, transmitting the hardware key to the server device comprises causing, based on the operation key, a secure connection to be established between the user device and the server device, and sending the hardware key to the server device via the secure connection. In some implementations, causing the secure connection to be established between the user device and the server device comprises causing, based on using the operation key as a session key, a transport layer security (TLS) connection to be established between the user device and the server device.

In some implementations, process 400 includes updating the registry of the user device to include the hash value as a registry key value associated with the hardware component.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
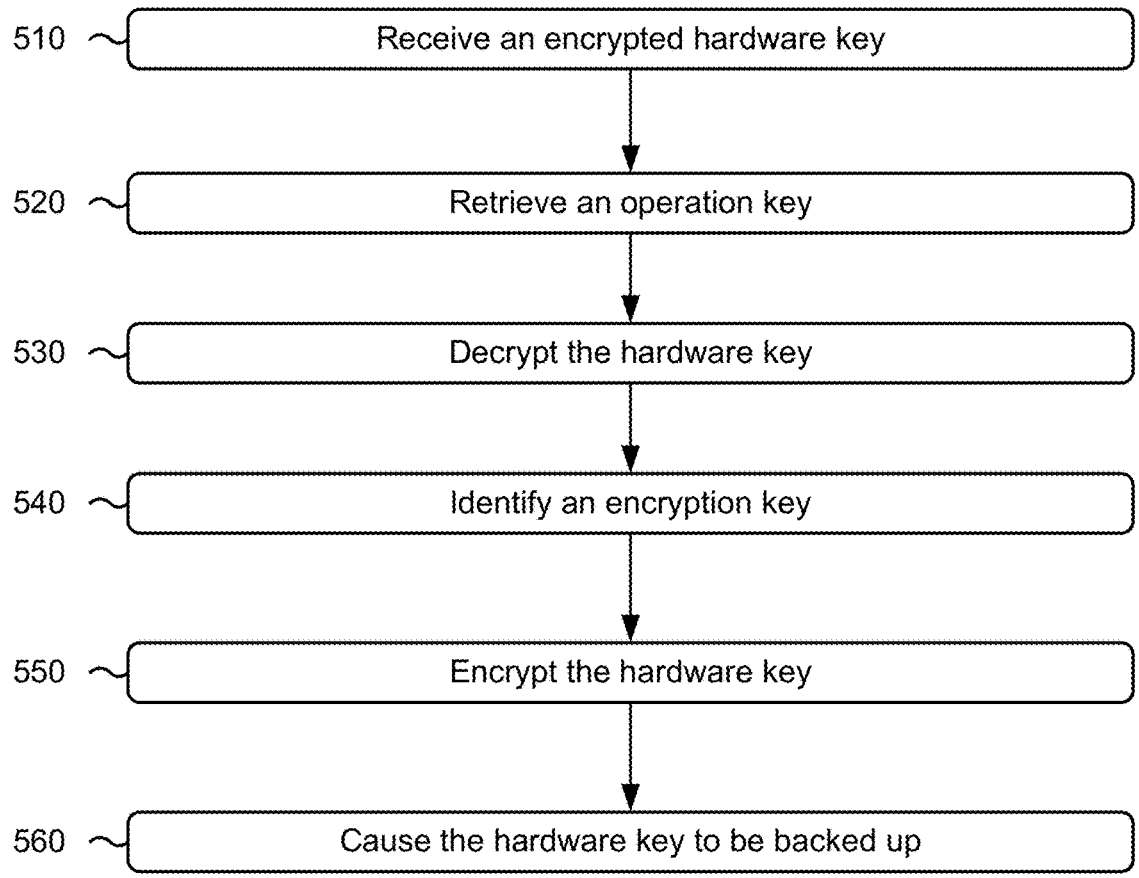

FIG. 5 is a flowchart of an example process 500 associated with backing up a hardware key. In some implementations, one or more process blocks of FIG. 5 may be performed by a server device (e.g., server device 110). In some implementations, one or more process blocks of FIG. 5 may be performed by another device or a group of devices separate from or including the server device, such as a user device (e.g., user device 105). Additionally, or alternatively, one or more process blocks of FIG. 5 may be performed by one or more components of device 300, such as processor 320, memory 330, storage component 340, input component 350, output component 360, and/or communication component 370.

As shown in FIG. 5, process 500 may include receiving an encrypted hardware key (block 510). For example, the server device may receive, from a user device, a hardware key associated with a hardware component of the user device, as described above. In some implementations, the hardware key has been encrypted by the user device. In some implementations, the server device may receive the hardware key from the user device via a TLS connection between the server device and the user device.

As further shown in FIG. 5, process 500 may include retrieving an operation key (block 520). For example, the server device may retrieve an operation key that is associated with the user device from a first data structure that is associated with the server device, as described above. In some implementations, retrieving the operation key includes determining, based on receiving the hardware key, an identifier associated with the user device, searching, based on the identifier associated with the user device, the first data structure to identify an entry associated with the user device, and processing the entry associated with the user device to retrieve the operation key.

As further shown in FIG. 5, process 500 may include decrypting the hardware key (block 530). For example, the server device may decrypt, based on the operation key, the hardware key, as described above.

As further shown in FIG. 5, process 500 may include identifying an encryption key (block 540). For example, the server device may identify an encryption key that is associated with a second data structure that is associated with the server device, as described above.

As further shown in FIG. 5, process 500 may include encrypting the hardware key (block 550). For example, the server device may encrypt the hardware key, as described above. In some implementations, encrypting the hardware key includes processing, using an AES algorithm with the encryption key, the hardware key.

As further shown in FIG. 5, process 500 may include causing the hardware key to be backed up (block 560). For example, the server device may cause, based on encrypting the hardware key, the hardware key to be backed up in the second data structure, as described above.

In some implementations, process 500 includes sending, to the user device and after causing the hardware key to be backed up in the second data structure, a message indicating that the hardware key was successfully backed up.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    identifying, by a user device, one or more characteristics of the user device;
    determining, by the user device and based on the one or more characteristics, that the user device is to back up a hardware key that is associated with a hardware component of the user device,
        wherein backing up the hardware key allows the user device to obtain a backup copy of the hardware key from a server device to access the hardware component, and
        wherein determining that the user device is to back up the hardware key is based on determining that the user device belongs to a particular group of an entity, associated with the server device, based on the one or more characteristics;
    determining, by the user device, that the user device has an operation key,
        wherein the operation key is allocated to the user device by the server device and used to encrypt the hardware key and cause a secure connection to be established between the user device and the server device;
    retrieving, by the user device, the hardware key from a first data structure that is included in the user device;
    encrypting, by the user device and based on the operation key, the hardware key;
    processing, by the user device and after encrypting the hardware key, the hardware key to generate a hash value;
    determining, by the user device, that the hash value is not included in a registry of the user device; and
    transmitting, by the user device and based on determining that the hash value is not included in the registry, the hardware key to the server device to cause the hardware key to be backed up in a second data structure associated with the server device based on using the operation key as a session key to cause the secure connection to be established between the user device and the server device.

2. The method of claim 1, further comprising:
updating the registry of the user device to include the hash value as a registry key value associated with the hardware component.

3. The method of claim 1, wherein the one or more characteristics comprises at least one of:
a type of the user device;
a capability of the user device;
a role of the user device within a network; or
an organizational identifier associated with the user device.

4. The method of claim 1, wherein determining that the user device is to back up the hardware key comprises:
determining, based on the one or more characteristics, that the user device utilizes the hardware key;
determining, based on the one or more characteristics, that the user device is able to back up the hardware key; and
determining, based on determining that the user device utilizes the hardware key and that the user device is able to back up the hardware key, that the user device is to back up the hardware key.

5. The method of claim 1, wherein the operation key, the user device, and the server device are associated with the entity, and
wherein determining that the user device has the operation key comprises:
identifying a third data structure included in the user device that is associated with the entity;
searching the third data structure for the operation key; and
determining that the user device has the operation key based on successfully searching the third data structure for the operation key.

6. The method of claim 1, wherein the first data structure is associated with a trusted platform module (TPM) component of the user device, and
wherein retrieving the hardware key from the first data structure comprises:
communicating with the TPM component to obtain access to the first data structure; and
retrieving the hardware key from the first data structure after obtaining access to the first data structure.

7. The method of claim 1, wherein encrypting the hardware key comprises:
processing, using an advanced encryption standard (AES) algorithm with the operation key as an encrypting key, the hardware key.

8. The method of claim 1, wherein processing the hardware key to generate the hash value comprises:
processing, using a secure hash algorithm (SHA), the hardware key to generate the hash value.

9. The method of claim 1, wherein determining that the hash value is not included in the registry of the user device comprises:
identifying a set of registry key values in the registry,
determining that the hash value does not match any registry key value of the set of registry key values; and determining that the hash value is not included in the registry based on determining that the hash value does not match any registry key value of the set of registry key values.

10. The method of claim 1, wherein transmitting the hardware key to the server device comprises:
causing, based on the operation key, the secure connection to be established between the user device and the server device; and
sending the hardware key to the server device via the secure connection.

11. The method of claim 10, wherein causing the secure connection to be established between the user device and the server device comprises:
causing, based on using the operation key as the session key, a transport layer security (TLS) connection to be established between the user device and the server device.

12. A user device, comprising:
one or more processors configured to:
retrieve a hardware key associated with a hardware component of the user device from a first data structure that is included in the user device to back up the hardware key,
wherein backing up the hardware key allows the user device to obtain a backup copy of the hardware key from a server device to access the hardware component, and
wherein retrieving the hardware key is based on determining that the user device is to back up the hardware key based on the user device belonging to a particular group of an entity, associated with the server device;
encrypt the hardware key using an operation key,
wherein the operation key is allocated to the user device by the server device and used to encrypt the hardware key and cause a secure connection to be established between the user device and the server device;
process, after encrypting the hardware key, the hardware key to generate a hash value;
determine that the hash value is not included in a registry of the user device; and
transmit, based on determining that the hash value is not included in the registry, the hardware key to the server device to cause the hardware key to be backed up in a second data structure associated with the server device based on using the operation key as a session key to cause the secure connection to be established between the user device and the server device.

13. The user device of claim 12, wherein the one or more processors, to retrieve the hardware key from the first data structure, are configured to:
communicate with a cryptoprocessor of the user device to obtain access to the first data structure; and
retrieve the hardware key from the first data structure after obtaining access to the first data structure.

14. The user device of claim 12, wherein the one or more processors, to process the hardware key to generate the hash value, are configured to:
process, using a secure hash algorithm (SHA), the hardware key to generate the hash value.

15. The user device of claim 12, wherein the one or more processors, to determine that the hash value is not included in the registry of the user device, are configured to:

identify a set of registry key values associated with the hardware component in the registry,
    determine that the hash value does not match any registry key value of the set of registry key values; and
determine that the hash value is not included in the registry based on determining that the hash value does not match any registry key value of the set of registry key values.

16. A non-transitory computer-readable medium storing a set of instructions, the set of instructions comprising:
one or more instructions that, when executed by one or more processors of a user device, cause the user device to:
    retrieve a hardware key associated with a hardware component of the user device from a first data structure that is included in the user device to back up the hardware key,
        wherein backing up the hardware key allows the user device to obtain a backup copy of the hardware key from a server device to access the hardware component, and
        wherein retrieving the hardware key is based on determining that the user device is to back up the hardware key based on the user device belonging to a particular group of an entity, associated with the server device;
    encrypt the hardware key using an operation key,
        wherein the operation key is allocated to the user device by the server device and used to encrypt the hardware key and cause a secure connection to be established between the user device and the server device;
    process, after encrypting the hardware key, the hardware key to generate a hash value;
    determine that the hash value is not included in a registry of the user device; and
    transmit, based on determining that the hash value is not included in the registry, the hardware key to the server device to cause the hardware key to be backed up in a second data structure associated with the server device based on using the operation key as a session key to cause the secure connection to be established between the user device and the server device.

17. The user device of claim 16, wherein the one or more instructions, that cause the one or more processors to retrieve the hardware key from the first data structure, cause the one or more processors to:
    communicate with a cryptoprocessor of the user device to obtain access to the first data structure; and
    retrieve the hardware key from the first data structure after obtaining access to the first data structure.

18. The user device of claim 16, wherein the one or more instructions, that cause the one or more processors to process the hardware key to generate the hash value, cause the one or more processors to:
    process, using a secure hash algorithm (SHA), the hardware key to generate the hash value.

19. The user device of claim 16, wherein the one or more instructions, that cause the one or more processors to determine that the hash value is not included in the registry of the user device, cause the one or more processors to:
    identify a set of registry key values associated with the hardware component in the registry,
    determine that the hash value does not match any registry key value of the set of registry key values, and
    determine that the hash value is not included in the registry based on determining that the hash value does not match any registry key value of the set of registry key values.

20. The user device of claim 16, wherein the one or more instructions, that cause the one or more processors to encrypt the hardware key, cause the one or more processors to:
    process, using an advanced encryption standard (AES) algorithm with the operation key as an encrypting key, the hardware key.

* * * * *